(12) United States Patent
Schwab et al.

(10) Patent No.: US 10,401,981 B2
(45) Date of Patent: *Sep. 3, 2019

(54) INPUT DEVICE FOR TOUCH-SENSITIVE, CAPACITIVE SURFACES

(71) Applicant: STAEDTLER Mars GmbH & Co. KG, Nürnberg (DE)

(72) Inventors: Oliver Schwab, Cadolzburg (DE); Peter Weiss, Nürnberg (DE); Rilke Dix, Bamberg (DE); Jürgen Adler, Kleinseebach (DE); Arno Castner, Rückersdorf (DE); Max Bergmann, Hard (AT); Alexander Vyhnal, Nürnberg (DE)

(73) Assignee: STAEDTLER MARS GMBH & CO. KG, Nürnberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/889,288

(22) PCT Filed: Apr. 12, 2014

(86) PCT No.: PCT/EP2014/000983
§ 371 (c)(1),
(2) Date: Nov. 5, 2015

(87) PCT Pub. No.: WO2014/180529
PCT Pub. Date: Nov. 13, 2014

(65) Prior Publication Data
US 2016/0077613 A1 Mar. 17, 2016

(30) Foreign Application Priority Data

May 8, 2013 (DE) .......................... 10 2013 008 232

(51) Int. Cl.
*G06F 3/0354* (2013.01)
*B43K 29/00* (2006.01)
*G06F 3/044* (2006.01)

(52) U.S. Cl.
CPC .......... *G06F 3/03545* (2013.01); *B43K 29/00* (2013.01); *G06F 3/044* (2013.01)

(58) Field of Classification Search
CPC .................................................. G06F 3/03545
See application file for complete search history.

(56) References Cited

U.S. PATENT DOCUMENTS 5,486,550 A 1/1996 Lubas
5,567,233 A * 10/1996 Beck ...................... C09D 11/18
106/460

(Continued)

FOREIGN PATENT DOCUMENTS

DE 4320959 C2 1/1995
DE 19626842 A1 1/1998

(Continued)

*Primary Examiner* — Patrick F Marinelli
(74) *Attorney, Agent, or Firm* — Lucas & Mercanti, LLP; Klaus P. Stoffel

(57) ABSTRACT

An input device for touch-sensitive, capacitive surfaces, including an application device having at least one application element and at least one contacting element. The application device is designed as a holder filled with a liquid, gel-like, or pasty application medium. The holder of the application device is non-conductive at least in the gripping region. The application medium is electrically conductive, and an electrically conductive connection is formed between the at least one contacting element and the liquid, gel-like, or pasty application medium.

5 Claims, 2 Drawing Sheets

(56) References Cited

U.S. PATENT DOCUMENTS

| | | | |
|---|---|---|---|
| 5,767,172 A * | 6/1998 | Fukasawa | C09D 11/18 260/DIG. 38 |
| 5,914,708 A | 6/1999 | LaGrange et al. | |
| 6,089,776 A * | 7/2000 | Kaufmann | B43K 5/00 401/198 |
| 6,616,741 B1 * | 9/2003 | Sawa | C09D 11/17 106/31.28 |
| 8,599,174 B2 * | 12/2013 | Cohen | G06F 3/03545 345/156 |
| 8,922,530 B2 * | 12/2014 | Pance | G06F 3/03545 345/179 |
| 9,092,077 B2 * | 7/2015 | Boyd | B43K 7/02 |
| 2004/0246211 A1 | 12/2004 | Perkins et al. | |
| 2008/0266267 A1 * | 10/2008 | Chang | G06F 3/03545 345/173 |
| 2011/0164000 A1 * | 7/2011 | Pance | G06F 3/03545 345/179 |
| 2012/0013658 A1 * | 1/2012 | Otis | B41J 2/17513 347/6 |
| 2012/0086664 A1 * | 4/2012 | Leto | B43K 7/005 345/174 |
| 2012/0092421 A1 * | 4/2012 | Pan | B41J 2/1433 347/61 |
| 2013/0038579 A1 * | 2/2013 | Boyd | B43K 7/02 345/179 |
| 2013/0249870 A1 * | 9/2013 | Slaby | G06F 3/044 345/179 |
| 2015/0015523 A1 * | 1/2015 | Boyd | B43K 7/02 345/173 |
| 2015/0042624 A1 * | 2/2015 | Hashimoto | G06F 3/03545 345/179 |
| 2015/0169106 A1 * | 6/2015 | Dix | G06F 3/039 345/174 |
| 2015/0261325 A1 * | 9/2015 | Dix | G06F 3/039 345/179 |
| 2015/0367673 A1 * | 12/2015 | Thies | B43K 8/003 401/96 |
| 2016/0077613 A1 * | 3/2016 | Schwab | B43K 29/00 345/179 |
| 2016/0098104 A1 * | 4/2016 | Schwab | B43K 29/00 345/179 |
| 2016/0132137 A1 * | 5/2016 | Westhues | G06F 3/03545 345/179 |
| 2016/0209957 A1 * | 7/2016 | Jung | G06F 3/044 |

FOREIGN PATENT DOCUMENTS

| | | |
|---|---|---|
| DE | 29714594 U1 | 12/1998 |
| EP | 0283250 A2 | 9/1988 |
| GB | 2314852 A | 1/1998 |

* cited by examiner

INPUT DEVICE FOR TOUCH-SENSITIVE, CAPACITIVE SURFACES

The present application is a 371 of international application PCT/EP2014/000983, filed Apr. 12, 2014, which claims priority of DE 10 2013 008 232.3, filed May 8, 2013, the priority of these applications is hereby claimed and these applications are incorporated herein by reference.

BACKGROUND OF THE INVENTION

The invention relates to an input device for touch-sensitive capacitive surfaces, wherein the device is formed as a writing, drawing and/or painting implement filled with an application medium or as a cosmetic implement.

Input devices for surfaces/displays of this type are known in principle.

Thus, for example, input stylus pens are known which consist of an electrically conductive barrel one end of which is provided with a soft, conductive elastic contact head for the display or the surface of the display.

The disadvantage with input styluses of this type is that they are too expensive to use purely as an input stylus and in addition, do not have any writing and/or application functions.

Furthermore, input styluses are known which comprise a writing means or an applicator at one end and at the other end an electrically conductive arrangement in the form of a contact head which allows or initiates an input function when the capacitive display is touched.

However, the known input pens mentioned above suffer from many disadvantages.

Thus, pens of this type are expensive to manufacture since the barrels are conductive, which until now has not been a necessity for conventional application devices. Furthermore, nearly all of such prior art input pens are constructed as ballpoint pens, and so users are very restricted in their choice of writing medium.

US 2008/0266267 A1 discloses an input pen which essentially consists of a pure stylus element. This stylus element is a universal pen which, because of its conductive barrel, functions as an input element, wherein optionally, various indication, application devices and the like can be docked onto this input element, but do not have anything to do with the actual function.

The disadvantage with this solution is that the input pen is expensive to manufacture. In addition, the indication and/or application devices disposed on the input pen can easily be lost.

SUMMARY OF THE INVENTION

Thus, the object of the invention is to provide an input device for touch-sensitive capacitive surfaces which do not suffer from the disadvantages mentioned above, wherein the input device also has an application function as well as the input function.

A further object of the invention is to integrate a capacitive input function into a known application device in an inexpensive manner without radical constructional changes.

The term "application devices" as used below should be understood to include writing, drawing and/or painting devices such as felt-tip pens, gel or ballpoint pens.

Furthermore, an "application device" should also be understood to include a cosmetic implement which is formed, for example, as a mascara wand or as a liquid eyeliner.

The input device for touch-sensitive, capacitive surfaces of the invention consists of at least one application device with at least one application element and at least one contacting element for touch-sensitive capacitive displays. The application device is formed as a pen filled with a liquid, gel or pasty application medium, wherein the pen or barrel of the application device is not conductive, or at least does not have to be conductive in construction in the user's gripping region. The application medium, on the other hand, is electrically conductive, whereupon there is an electrically conductive connection between the at least one contacting element and the liquid, gel or pasty application medium.

In this regard, it has surprisingly been shown that the pen of the input device does not have to be conductive in construction. Examples of non-conductive pens are those with barrels formed from thermoplastic synthetic materials such as polypropylene (PP) or polyethylene (PE).

Furthermore, it has surprisingly been shown that a non-solid substance or application medium, in the present case a liquid, gel or pasty substance, is formed as a functional element of the input device.

The liquid application medium may be present as a free liquid or as a capillary action liquid in a reservoir system in the pen. The liquid application medium in this case may be an ink or paint system or drawing ink. In this regard, it is irrelevant whether the application medium is aqueous or non-aqueous. The only important factor for it to function in an input device is that the respective application medium is electrically conductive.

When the application medium is a gel, then this medium may be a thixotropic or shear-thinning composition, as is conventional with gel pens. Examples which may be mentioned are conventional gel formulations and, of course, metallic effect gels which are known in the art.

When the application medium is a paste, then it may, for example, be a ballpoint pen paste. Pastes of this type obtain their conductivity by means of additives or conducting agents.

Irrespective of the embodiment of the application medium, it is in fact vital that an electrically conductive connection is formed between the contacting element and the conductive application medium. As a rule, the contacting element consists of a pliable contact element and a conducting element, wherein at least the conducting element is electrically conductive. The contact element may be either conductive or non-conductive. If the contact element is not conductive, for example a thin layer of rubber, then a capacitive element is formed between the tablet surface and the conducting element, which results in charge transfer at the surface of the tablet.

Alternatively, the contacting element may also be formed as one piece, wherein one end of the one-piece element is brought into contact with the application medium in the reservoir element, whereupon a conductive connection is formed. In this case, the contacting element is completely conductive.

In this case, the contacting element may be disposed at the end of the device opposite to the front application tip and/or on an end cap for the application element of the pen.

FIGS. 1 and 2 below are provided for a better understanding of the solution in accordance with the invention.

DETAILED DESCRIPTION OF THE INVENTION

Figure 1:
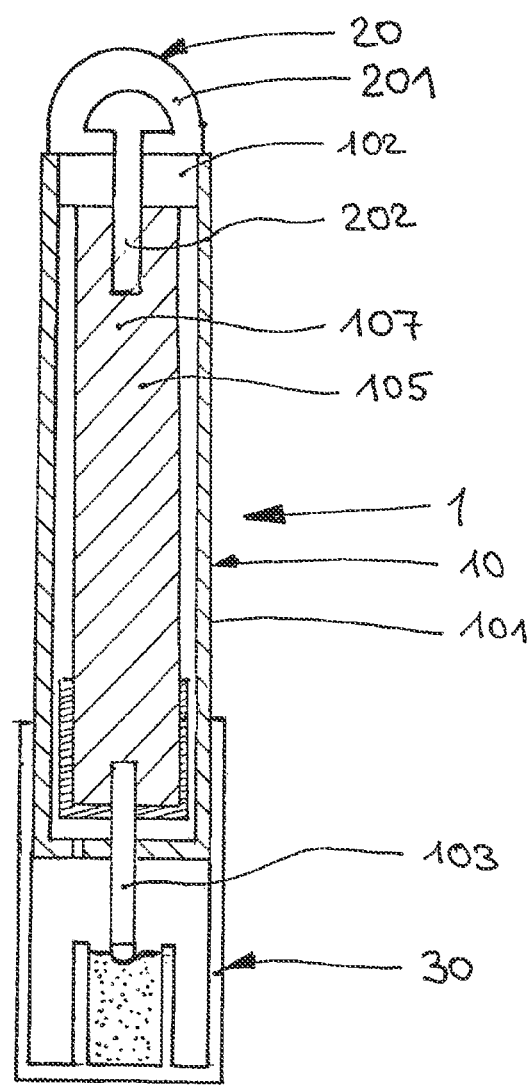
FIG. 1 is a cross section of a first embodiment.

FIG. 1 shows a first possible embodiment of an input device 1, in which the application device 10 is formed as a pen 101 with an application element 103, reservoir system 107 and an end stopper 102. The pen 101 or the application element 103 is closed by a removable end cap 30. A contacting element 20 consisting of an electrically conductive conducting element 202 and an electrically conductive contact element 201 in the form of a doped rubber tip is integrated into and/or fixed on the end stopper 102. The electrically conductive conducting element 202 penetrates through the end stopper 102 and is pushed into the reservoir system 107 in a manner such that an electrically conductive connection is formed between the conducting element 202 and the reservoir system 107 impregnated with electrically conductive application medium 105. An elastic and conductive contact element 201 is held by the undercut section of the mushroom-shaped conducting element 202. In this manner, a continuous conductive connection is formed between the conductive contact element 201 and the reservoir system 107.

The material of the pen or barrel, which as a rule contains the gripping region, is not electrically conductive.

In the case of using or inputting onto a tablet, touch screen or capacitive display (not shown), the contact element 201 contacts the surface of the tablet and thus makes a conductive connection with the reservoir system impregnated with ink.

Surprisingly, it has now been shown that the "input" function also functions when the pen/barrel is formed as an electrical insulator. In this case, a capacitive element is formed between the fingers of the user and the reservoir system, whereupon a charge transfer takes place on the tablet and thus an input is successfully entered.

In a variation (not shown), inside the pen (101) there is no reservoir system (107), but the application medium (105) is present as a free liquid in the form of ink, drawing ink or paint.

Figure 2:
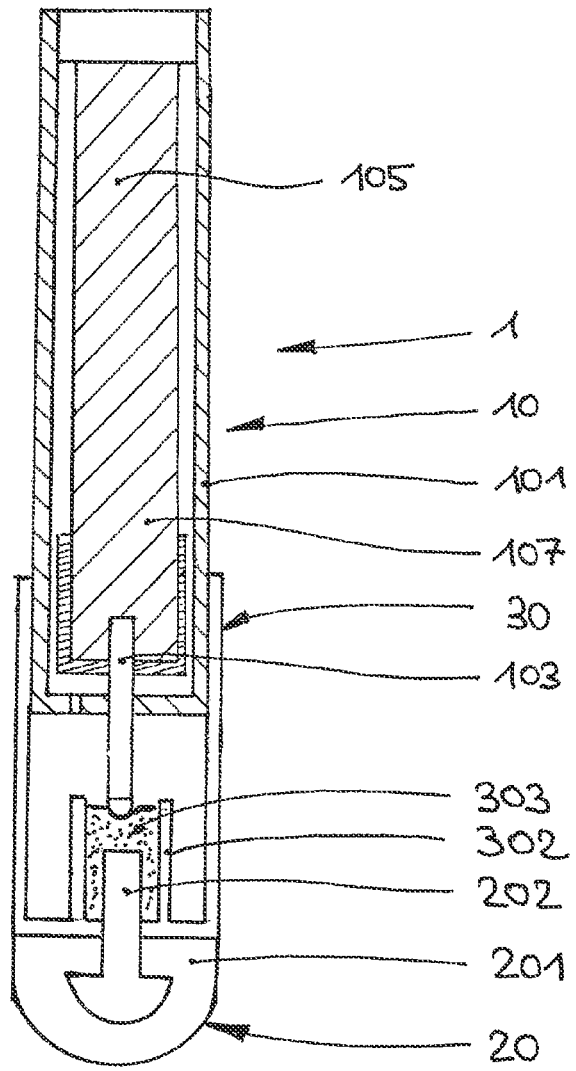
FIG. 2 is a cross section of a second embodiment.

FIG. 2 shows a second possible embodiment of an input device 1, in which the application device 10 is formed as a pen 101 with an application element 103, reservoir system 107 and an end stopper 102. The pen 101 or the application element 103 is closed by a removable end cap 30. A contacting element 20 is integrated into and/or fastened to the end cap 30. The contacting element consists of a conductive contact element 201 and an electrically conductive conducting element 202. The metallic or doped plastic forming the conducting element 202 penetrates through the front of the end cap 30 and penetrates into a moistening element 303 housed in the inner cap 302.

The moistening element/primer 303 is usually impregnated with the application medium 105 which is also that which is stored in the pen 101 or reservoir system 107 and thus is also conductive. The moistening element 303 is also conductively connected with the reservoir system 107 via the application element 103. In this manner, an electrically conductive connection is formed between the conducting element 202 and the reservoir system 107 impregnated with the electrically conductive application medium 105.

An elastic and conductive contact element 201 is held by the undercut section of the mushroom-shaped conducting element 202.

Naturally, the contacting element may also be formed as one piece, i.e. the contact element and conducting element are formed from one conductive material.

As described in FIGS. 1 and 2, the application medium must be conductive. The conductivity of a substance or mixture of substances depends on the availability of mobile charge carriers. Examples of mobile charge carriers in liquids are ions.

Some examples of formulations which fulfil the criterion of conductivity will now be given.

Formation Example 1: Yellow Text Highlighter in Accordance with DE 43 20 959 C2, Example 8.1

| | |
|---|---|
| Water | 470 g |
| Lanolin sulphosuccinate | 20 g |
| Benzisothiazolinone | 2 g |
| Pentaglycerine | 100-150 g |
| Basic Yellow 40 (500%) | 6.5 g |
| Solvent Yellow 43 | 0.5 g |
| Synthetic material dispersion (40-42%) + further steps for production, see DE 43 20 959 C2 | 420 g |

DE 43 20 959 C2 contains many examples of inks which also fulfil the criterion of conductivity and may be used in the input device in accordance with the invention.

Formation Example 2: Permanent Black Ink

| | |
|---|---|
| n-propanol | 89.3% by weight |
| Water | 0.3% by weight |
| Binder | 3.5% by weight |
| 3-methylbenzoic acid | 0.2% by weight |
| Paraffin wax | 0.2% by weight |
| Solvent Blue 129 | 5.5% by weight |
| Solvent Violet 9 | 1.0% by weight |

Formulation example 2 is known from DE 196 26 842 A1. Reference should be made to formulation examples 1.1 to 2.0 in that document for other inks which are also conductive because of their composition.

Formation Example 3: Red Ink for Fibre-Tip Pen

| | |
|---|---|
| Water | 61.8% by weight |
| Preservative | 0.2% by weight |
| Beeswax | 0.3% by weight |
| Triethanolamine | 0.3% by weight |
| Emulsifying agent | 1.4% by weight |
| Gum Arabic | 0.1% by weight |
| Diethylene glycol | 32.1% by weight |
| Colorant | 3.8% by weight |

Formulation example 3 is known from DE 297 14 594 U1. Reference should be made to formulation examples 1 to 9 in that document for other inks which are also conductive because of their composition.

The advantages of the solutions described in an exemplary manner in FIGS. 1 and 2 are that commercially available writing implements can be modified to form a stylus by only marginal changes—if any—which do not interfere with dispensing the writing medium. The changes are generally only made to the end stoppers and the end caps with which the contacting element is equipped.

LIST OF REFERENCE NUMERALS 1 input device
10 application device
101 pen
102 end stopper
103 application element
105 application medium
107 reservoir system
20 contacting element
201 contact element
202 conducting element
30 end cap
302 inner cap
303 moistening element

The invention claimed is:

1. An input device for touch-sensitive, capacitive surfaces, comprising:
   an application device having at least one application element;
   an end cap that includes a moistening element housed inside the end cap; and
   at least one contacting element, integrated in the end cap, comprising of a conductive element,
   wherein the application device is configured as a pen filled with a liquid, gel or pasty application medium that is electrically conductive,
   the end cap being removably attached to the barrel,
   wherein the application device has a barrel that is non-conductive,
   wherein the moistening element is impregnated with the liquid, gel, or pasty application medium that is electrically conductive,
   wherein the conducting element penetrates through a front of the end cap and penetrates into the moistening element,
   wherein an electrically conductive connection is provided between the at least one contacting element and the liquid, gel or pasty application medium,
   wherein, when the application element is closed by the end cap, the electrically conductive connection is further provided by an electrically conductive contact between the conductive element, the moistening element, the at least one contacting element, and the liquid, gel or pasty application medium.

2. The device as claimed in claim 1, wherein the at least one contacting element further comprises an elastic and conductive contact element.

3. The device as claimed in claim 2, wherein the conductive element is a mushroom-shaped conducting element.

4. The device as claimed in claim 3, wherein the elastic and conductive contact element is held by an undercut section of the mushroom-shaped conducting element.

5. The device as claimed in claim 1, wherein the conductive element is a mushroom-shaped conducting element.

* * * * *